United States Patent [19]
Dochterman

[11] 3,848,837
[45] Nov. 19, 1974

[54] MOUNTING ADAPTER MEANS FOR DYNAMOELECTRIC MACHINE

[75] Inventor: Richard W. Dochterman, Fort Wayne, Ind.

[73] Assignee: General Electric Company, Fort Wayne, Ind.

[22] Filed: June 15, 1973

[21] Appl. No.: 370,302

Related U.S. Application Data

[63] Continuation-in-part of Ser. No. 200,525, Nov. 19, 1971, Pat. No. 3,740,599.

[52] U.S. Cl. .................................. 248/14, 310/91
[51] Int. Cl. ........................................... H02k 5/00
[58] Field of Search ............... 248/26, 14, 18, 300; 24/73 B, 81 B; 310/52, 55, 91, 71, 89, 85, 51, 65

[56] References Cited
UNITED STATES PATENTS

| | | | |
|---|---|---|---|
| 2,467,296 | 4/1949 | Doe | 248/18 |
| 2,823,852 | 2/1958 | Busch | 248/14 X |
| 2,838,262 | 6/1958 | Anderson | 248/26 |
| 2,936,140 | 5/1960 | Copeland | 248/26 |
| 3,173,178 | 3/1965 | Kumburis | 248/300 X |
| 3,235,653 | 2/1966 | Ostrognai | 248/26 X |
| 3,432,705 | 3/1969 | Lindtveit | 310/91 |

Primary Examiner—J. Franklin Foss

[57] ABSTRACT

Mounting adapter means for augmenting predetermined outer peripheral configuration of motor with spaced apart coolant passing openings. Such means may be clips fastened to the motor adjacent surface. Clips have resiliently movable elements that snap fit in motor structure openings so as to facilitate assembly and yet provide a reliable and stable arrangement. Clips resist undesirable distortion or deformation thereof during use and include offset stabilizing segments. Clips may be fabricated by stamping clip blanks from a strip of sheet material and then forming the stamped blanks to a desired clip configuration.

10 Claims, 8 Drawing Figures

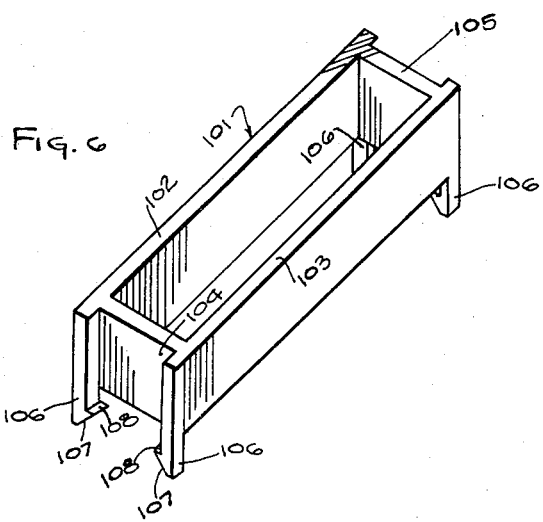
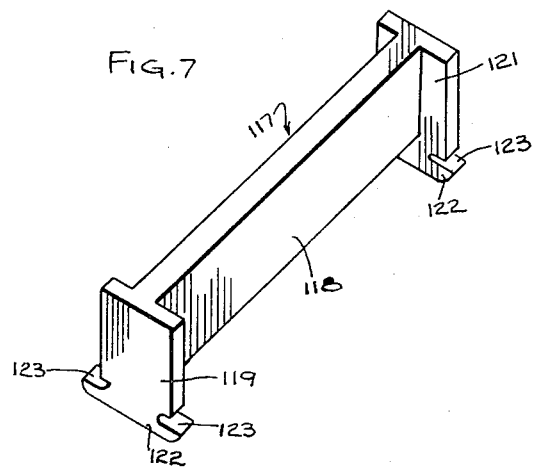
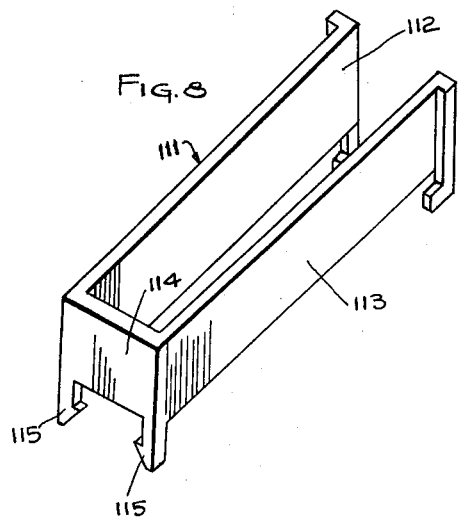

MOUNTING ADAPTER MEANS FOR DYNAMOELECTRIC MACHINE

CROSS-REFERENCE TO RELATED APPLICATIONS

This application is a continuation-in-part application of my patent application Serial No. 200,525 filed Nov. 19, 1971, now U.S. Pat. No. 3,740,599 the entire disclosure of which is specifically incorporated herein by reference. This application claims subject matter that was the subject of a requirement for restriction in the just referenced patent application.

BACKGROUND OF THE INVENTION

This invention relates generally to machine mounting arrangements that facilitate supporting a dynamoelectric machine having a first configuration, e.g., a housing of a first size, by means of a mounting member that is particularly adapted to support a dynamoelectric machine of a second, different configuration or size.

Numerous types of mounting arrangements have been used heretofore for securing dynamoelectric machines, e.g., motors, to supporting structures in a desired position relative to means driven by such motors. General approaches followed heretofore have included the use of axially projecting mounting studs; motor supports in the form of cradle type bases; and band type mounts in the form of hoop or ring-shaped flat straps, or hoop or ring-shaped wires.

As will be understood, band mounts have been used by equipment manufacturers to support different types of motors in driving relationship with diverse types of apparatus, e.g., appliances and air moving equipment. In many instances, the band mounts themselves have been provided from one source and motors having a desired performance rating have been provided from another source. In at least some of these cases, the structural details of a band mount selected by a particular equipment manufacturer has not been configured to properly support all of the different motor models capable of meeting or exceeding the desired performance rating. This of course reduces the options available to the particular manufacturer with regard to selecting commercially available motors for use with that manufacturer's equipment. This also reduces the options available to persons or service organizations who are, from time to time, faced with the problem of replacing motors in such manufacturer's equipment subsequent to failure in the field.

For example, in those cases where two or more different motor models would each meet desired performance standards but each have different nominal outer diameters; the selection of a specific band mount having a motor mounting diameter corresponding to only one specific size of such motors has heretofore effectively prevented the use of all but that specific size of motors by both original equipment manufacturers and by field service personnel.

Accordingly, it would be desirable to provide means that would permit the utilization of one or more differently sized or configured motors with equipment that has originally been supplied with band type mounts which are not particularly designed to support such differently sized motors. Moreover, it would be desirable that such means facilitate field replacement of band mounted motors of a first nominal physical size with motors of a different nominal size. The provision of such means would be particularly desirable in those applications wherein motors having desired performance characteristics are available in smaller physical sizes than heretofore; or where changes in equipment applications or requirements permit the use of smaller motors then originally contemplated.

While one approach to the utilization of differently sized motors by original equipment manufacturers would be to redesign the equipment and/or motor mounting means so as to accommodate such motors, this approach would not completely solve the problem and various practical considerations have discouraged this approach. For example, the actual size of competitively rated motors may still vary from one motor manufacturer to another. In addition, the redesign and retooling expense that would be involved in changing mounting arrangements may be prohibitive to relatively small equipment manufacturers. Furthermore, a change in equipment design or mounting hardware would reduce the ease with which a manufacturer's equipment already in the field could be repaired by interchanging parts currently used by the manufacturer. Thus, any changes in the physical sizes of parts (including, for example, motors) or mounting arrangements for a given type of equipment, would more desirably be such that parts used both currently and heretofore in the manufacture of such type of equipment may also be used as replacement parts for the same type of equipment in the field.

It will thus be understood that it would be desirable to provide mounting adapter means for dynamoelectric machines and assemblies or mounting arrangements including such adapter means for mutually accommodating a mounting member of a first nominal configuration and a dynamoelectric machine of a different nominal configuration. Furthermore, it would be desirable, if not necessary, that such adapter means satisfactorily withstand mounting and holding forces applied to the dynamoelectric machine so that a stable and reliable mounting arrangement will result; and that such adapter means be readily assembled with a dynamoelectric machine so supported, and yet resist inadvertent disassembly.

SUMMARY OF THE INVENTION

Accordingly, it is an object of the present invention to provide means for use in mounting dynamoelectric machines whereby driven or driving dynamoelectric machines having first nominal configurations may be reliably supported by mounting structure having different nominal configurations.

Another object of the present invention is to provide new and improved mounting adapter means that may be used to mount a dynamoelectric machine of a first size with a mounting member that is particularly designed to accommodate a dynamoelectric machine of a second, larger size.

Briefly, these and other objects are achieved in accordance with one form of my invention by an improved arrangement which, in an illustrated embodiment, includes adapter means for augmenting the peripheral configuration of a motor structure having a first predetermined outer peripheral configuration (i.e., a nominal outer diameter) and having a plurality of spaced apart openings therein that may be utilized for cooling the motor during operation thereof. In the illustrated embodiments, the adapter means comprise a plurality of spaced apart clips, e.g., spacer clips that are fastened to the shell or casing of a motor adjacent to at least two spaced apart coolant passages formed therein. In a preferred form, the clips are fabricated of a material that may be resiliently deflected during assembly with a motor so as to facilitate such assembly and yet provide a reliable arrangement that facilitates mounting the motor in a desired environment in a stable manner. In preferred forms, the clips resist undesirable distortion or deformation thereof during mounting of the motor assembly and thereby contribute to stable mounting arrangements. In preferred exemplifications, the clips are fabricated by stamping clip blanks from a strip of sheet material and then forming the stamped blanks to a desired clip configuration. Thereafter, the clips may be readily assembled with motors or other dynamoelectric machines. It will be understood, however, that molded clips (e.g., from plastic) also could be used.

The subject matter which I regard as my invention is particularly pointed out and distinctly claimed in the concluding portion of this specification. The invention, itself, however, both as to its organization and method of operation, together with further objects and advantages thereof, may be better understood by reference to the following description taken in connection with the accompanying drawing.

BRIEF DESCRIPTION OF THE DRAWING

In the drawing:

FIG. 6 is a perspective view of another embodiment of a clip formed from a thermoresponsive resinous material;

FIG. 7 is a perspective view of still another clip embodying the invention; and

FIG. 8 is a perspective view of yet another clip embodying the invention.

DESCRIPTION OF THE PREFERRED EMBODIMENTS

Figure 1:
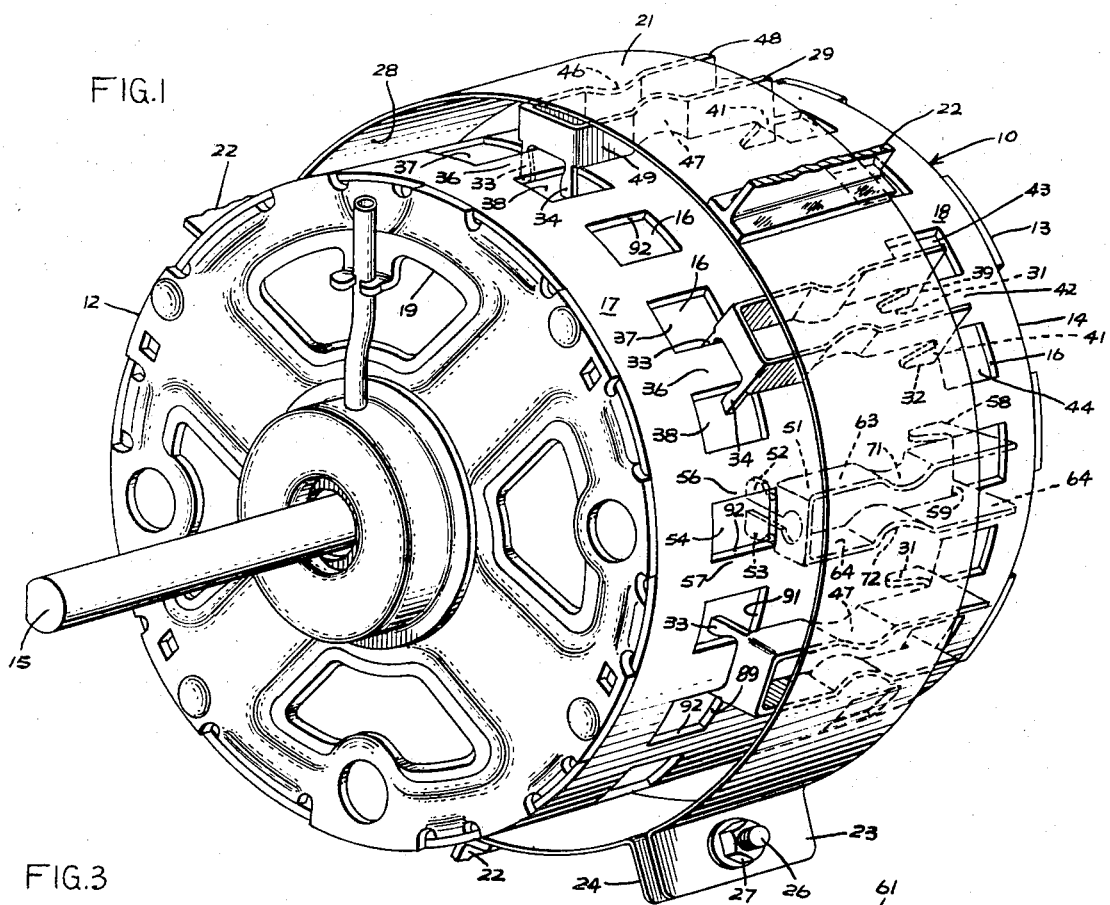
FIG. 1 is a perspective view, with parts broken away of an assembly of mounting adapter means, embodying the present invention in one form, and a motor supported by a band type mount.

Turning now to the drawing and particularly to FIG. 1, I have illustrated one form of the present invention incorporated in an arrangement that includes a motor 10 having a housing that includes a shell 14 and a pair of end frames 12, 13 disposed about a wound stator core. The end frame portions of the housing support suitable bearing means that rotatably support the shaft 15 of a not shown rotor. Since a description of the overall construction details of the motor 10, including the parts within the housing, is not necessary to an understanding of the invention, further description is not presented herein.

With continued reference to FIG. 1, the outer peripheral surface portion of the motor, i.e., the shell 14, is provided with a plurality of spaced apart openings 16 with a row of openings being generally adjacent to one end 17 of the shell and another row of openings being located generally adjacent to the end 18 of the shell. In addition, openings 19 are preferably provided in at least one of the end frames. During operation of the motor 10, a flow of a cooling medium, e.g., air or other coolant, through these openings may be used to advantage to cool the windings and at least part of the bearing system of the motor 10. This cooling benefit may be obtained of course whether the motor is of dual or unit bearing design; whether the motor utilizes shading coils or distributed auxiliary windings during starting; and whether or not one or more capacitors are connected in circuit with the energization windings of the motor.

Also included is mounting structure that may be a member in the form of the strap 21. The strap 21 is provided with a plurality of mounting arms 22 extending from the strap and fastened thereto in conventional manner, e.g., by welding or other suitable means.

Although the arms 22 have been broken away for clarity in FIG. 1, it will be understood that one or more arms may be used to fasten the mounting member, i.e., strap 21, to equipment that is to be powered by a motor supported within the strap 21. Moreover, the band type mounting member may be a wire hoop rather than the illustrated strap 21, as will be understood. Variations of this general approach are taught, for example, by Staak U.S. Pat. No. 2,936,947; Copeland U.S. Pat. No. 2,936,140; Reisch U.S. Pat. No. 2,832,554; Doe U.S. Pat. No. 2,467,296; and Seyfried U.S. Pat. No. 1,873,343. Of course, the arms 22 may be entirely omitted and the facing ends 23, 24 of the strap 21 may be used to clamp the strap to a supporting plate or panel in the equipment or appliance to be powered by the motor 10. When this approach is followed, the bolt 26 and nut 27 may be used to secure the strap 21 to the clamped plate or panel, or a plurality of such nuts and bolts may be used.

When following either of these approaches, the nut 27 and bolt 26 or other suitable means can be used to securely clamp at least portions of the inner surface 28 of the strap 21 or other mounting loop forming member against mounting adapter means that will be described in more detail hereinafter. Moreover, in both of the just described approaches, as well as in others, it will be generally desirable to support the motor 10 relative to the apparatus from which a mounting loop is suspended so that the center line of the shaft 15 thereof will be positioned in a predetermined manner relative to the loop. For example, it is often desirable for the center line of shaft 15 (i.e., the rotational axis of the shaft 15 of motor 10) to at least approximately coincide with the center of the mounting opening defined by the interior clamping surface 28 of the strap 21. For this reason, in FIG. 1, the adapter means are provided in the form of at least three substantially identical spaced apart members 29. Thus, for the illustrated cylindrical strap 21 and motor 10, a uniform gap is maintained therebetween through the use of members 29.

In the arrangement illustrated in FIG. 1, six members 29 are utilized, three of which are hidden by the motor 10 in the drawing. However, as few as three members 29 spaced apart approximately 120° about the periphery of the shell 14 could be used to establish a substantially uniform gap between the outer peripheral surface of the shell 14 and the internal surface 28 of the strap 21.

Particularly when the adapter means are in the form of a member that is fabricated from a flat blank of strip material, it is desirable for the adapter means to include a plurality of legs. Moreover, when at least three legs are provided, the adapter means is preferably shaped so that first and second legs are each joined at one end to a third leg. Furthermore, the legs are arranged so that the third leg will span a first peripheral surface portion of a dynamoelectric machine, and so that at least one of the other legs will span a different peripheral surface portion of the dynamoelectric machine. For ease of assembly with the motor 10, holding means that may be in the form of at least two spaced apart depending elements are also preferably provided to secure, with a snap fit, the adapter means to the dynamoelectric machine.

When the at least three legs of the adapter means are arranged on edge as relatively thin, generally planar spacers to be compressed or held between a mounting member and one or more dynamoelectric machine peripheral surfaces that are spanned by one or more of the legs; the advantages of a more stable arrangement may be obtained when stabilizing or stiffening means are provided along at least a portion of one or more of the at least three legs. In the preferred embodiments that will now be described in more detail, it is convenient to provide such stabilizing or stiffening means by deforming at least a segment of one or more of the at least three legs so that the segment is offset or otherwise extends from the plane of the leg to which the segment is attached. The offset segment will then prevent buckling or bending of the leg that is reinforced thereby. Of course, two or more stabilizers may be provided for each leg when desired.

Inspection of FIG. 1 will reveal that the members 29, hereafter referred to as clips 29, are three legged generally U or C-shaped structures. These clips are held in fixed relationship to the shell 14 of the motor 10 by means of depending elements 33, 34, and 39, 41. The elements 39, 41 include hooks or lips 31, 32 that hold the clips 29 to the shell 14 as illustrated. In the preferred exemplification, the elements 33, 34 snap fit against edge surfaces of the web 36 of the shell 14, it being noted that the web 36 constitutes a first peripheral surface portion spanned by a leg 66 or bight portion of the clip 29. In order to remove the clips 29 from the shell 14, it would be necessary to deflect the elements 33, 34 in the openings 37, 38 so as to release the portion of the web 36 that is trapped between the elements 33, 34. As revealed in the drawing, the elements 39, 41 are disposed on either side of a web 42 which separates adjacent openings 43, 44 as shown in FIG. 1.

With the clips 29 fastened to the shell 14, the motor 10 and clips may be readily positioned within the strap 21. Thereafter, the nut 26 and bolt 27 or other suitable clamping means may be used to tighten the strap against the clips 29 and thereby transmit clamping or mounting forces to the housing of the motor 10.

In order to avoid mounting instability that could result from these clamping forces and to provide an increased measure of reliability, the clips 24 each include stabilizing and stiffening means. These means comprise segments 46, 47 of the legs 48, 49 of the clips. These segments are of particular advantage in the case of clips 29 where the legs 48, 49 are made from relatively thin strip material that could be bent or otherwise deformed as a result of the clamping forces applied thereto when the legs 48, 49 are compressed between the shell 14 and the surface 28 of the strap 21.

To illustrate one type of relatively thin strip material that may be used, clips 29 were made from approximately fifty thousandths (0.050) of an inch thick cold rolled steel and then formed to the configuration shown in FIG. 1. The segments or offsets 46, 47 provided resistance both to buckling, twisting, and shifting of the legs 48 and 49 relative to the motor shell. The segments 46, 47 imparted structural stability to the clips 29 that would not otherwise have been obtained unless substantially thicker or wider strip material had been used to form the legs 48, 49.

Although clips 29 were actually made of steel; aluminum, aluminum alloys, or other sheet materials having sufficient strength characteristics for this type of application may also be used. Accordingly, reference herein to specific embodiments fabricated from steel is to be considered as illustrative only, and is not to be taken as a limiting disclosure.

The above described structural details of the clip 29 regarding the legs 48, 49 and offsets formed therein are also applicable to the clip 51 which has been shown in phantom in FIG. 1. However, the clip 51 is arranged to have depending elements 52, 53 formed at the bight portion thereof with both legs snapped into a single opening 54 in the shell 14. The elements 52, 53 are snapped against the edge surfaces 92 of two spaced apart webs 56, 57 as shown. In addition, the elements 58, 59 connected to the free ends of the legs 63, 64 of clip 51 are disposed within one opening of the shell 14 and operate (in a manner similar to the elements 39, 41 of clips 29) to prevent inadvertent removal of the clip 51 from the motor 10.

Figure 3:
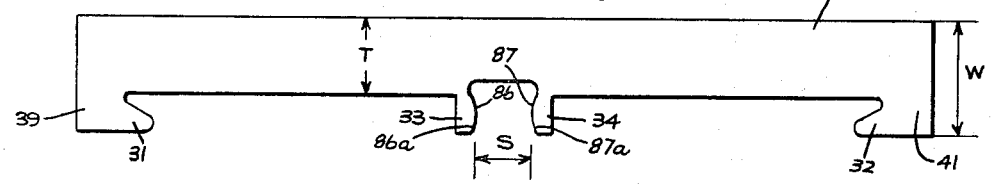
FIG. 3 is a stamped blank from which the clip of FIG. 2 may be formed.
Figure 5:
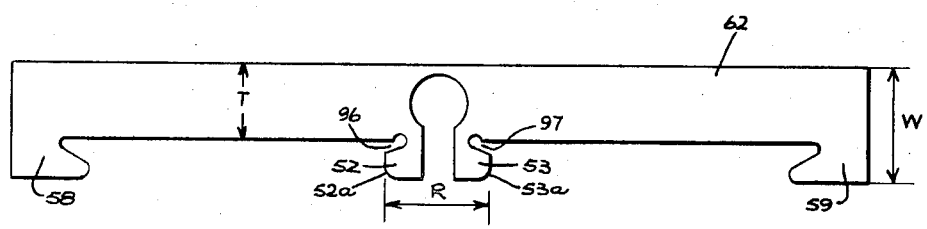
FIG. 5 is a blank from which the clip of FIG. 4 may be formed.
Figures 2, 4:
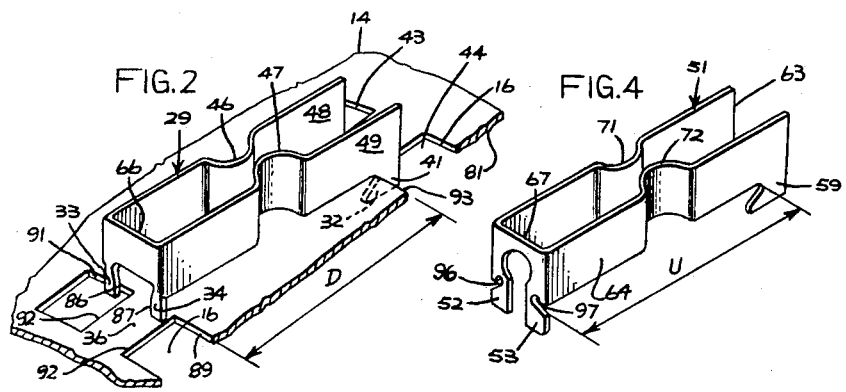
FIG. 2 is a perspective view (with parts broken away) of part of the assembly shown in solid lines in FIG. 1, and illustrates one method of assembling adapter means in the form of a clip to the motor of FIG. 1.
FIG. 4 is a perspective view of another form of clip that is shown in phantom in FIG. 1.

A more detailed description of the clips 29 and 51, shown respectively in FIGS. 2 and 4, will now be presented with reference also being made to FIGS. 3 and 5 which illustrate blanks of strip material from which the clips 29 and 51 may be formed. The blanks shown in FIGS. 3 and 5 were made from 0.050 (fifty thousandths) of an inch thick cold rolled steel, although other suitable materials (as above suggested) could be also be utilized. In addition, although the illustrated clips 29 and 51 were stamped and then formed, it will be understood that adapter means embodying the invention could be manufactured by utilizing other manufacturing techniques. For example, adapter means could be formed from moldable thermoresponsive materials, i.e., thermoplastic or thermosetting materials rather than formable strip material (whether metallic or not).

The blanks 61 and 62 (see FIGS. 3 and 5) each had a width indicated by the dimension W of about 0.480 (four hundred and eighty thousandths) of an inch. Furthermore, the height T of the indicated portions of the blanks was about 0.3 (three tenths) of an inch. The dimensions S and R were selected relative to the nominal dimensions of the webs 36 and openings 16 of the motor shell 14 so that the elements 33, 34 and 52, 54 would be fastened to the motor shell 14 with a snap fit.

For a motor shell having openings 16 formed therein of a nominal circumferential extent of about 0.6 (six tenths) of an inch and webs 36 having a nominal width of about 0.365 (three hundred and sixty-five thousandths) of an inch, the dimension S was selected to be about 0.36 (thirty-six hundredths) of an inch or less while the dimension R was selected to be about 0.605 (six hundred and five thousandths) of an inch or more. Furthermore, the overall length of the blanks 61 and 62 was selected so that, after the segments 46, 47, or 71, 72 were formed in the legs thereof, the span U between the bight portions 66 and 67 of the clips and the bight portions of the hooked legs 41, 59 was at least equal to or greater than the span D of the peripheral surface portion of the shell 14 to be spanned by the clips. Satisfactory results have been obtained when the span U of a clip 29 was about 1.8 (one and eight tenths) of an inch and when the span D of the shell 14 was about 1¾ (one and three-quarters) of an inch.

It will be understood, of course, that the unformed length of material in the blanks 61 and 62 is sufficiently long to provide the desired overall span dimension U of the clips and still permit formation of the segments 46, 47 and 71, 72. Satisfactory results were obtained when the segments 46, 47 were formed to have a radius of about ¼ (one-quarter) of an inch and had a clearance therebetween of about ¼ (one-quarter) of an inch after the clips were finally formed.

The clips 29 could be quite readily assembled with the shell 14 of the motor 10 by first inserting the elements 39, 41 into a pair of adjacent ones of the openings 16, as designated at 43 and 44 in FIG. 2, with the lips or tabs 31, 32 of the legs positioned adjacent to the interior surface 81 of the shell 14. Because of the tapered configuration of the tabs 31, 32 the elements 39 and 41 were readily hooked onto the shell 14 with the elements 33, 34 raised relative to and spaced from the web 36 as revealed in FIG. 2. Thereafter, the clip 29 was pivoted about the point of engagement between the elements 39, 41 and shell 14 so as to move the elements 33, 34 into snap-fitting engagement with the edge surfaces of the web 36. To effect the snap fit assembly, pressure was applied to the bight portion 66 of the clip 29 (e.g., eight manually or with a hammer). During assembly, the elements 33, 34 first flex apart and then snap toward one another to establish and maintain the assembled relationship with the web 36 of the shell.

A similar assembly procedure may be followed when utilizing the clip 51 shown in FIG. 4 although in this case, the elements 52 and 53 would first flex toward one another and then snap away from one another during insertion in an opening 16 in the shell 14.

It is noted, that of the two clips 29 and 51, the clip 29 would be preferred in those instances where it is difficult to maintain accurate dimensions of the openings 16. This may be the case, for example, when the motor shell 14 is formed by stamping the openings 16 in a flat strip and then rolling the strip to form the cylindrical shell 14. On the other hand, clip 51 would be preferred for applications where more precise manufacturing tolerances could be maintained for openings 16 than for webs 36. Of course, when there are similar manufacturing tolerances for both openings 16 and webs 36, it would be a matter of user's choice in selecting which of clips 29 and 51 would be used.

It should be understood that the foregoing detailed description has been presented only for purposes of exemplification. Thus, modifications may be made in the selection of materials, step-by-step procedures and fabrication of the adapter means selected, as well as dimensional relationships between various parts of a particular adapter means. Also, in some applications, it may be desirable to have the elements 33, 34 of a clip 29 depend from the clip legs 48, 49 rather than from the bight portion or leg 66 as illustrated. Moreover, it may be desirable to provide opposed pairs of elements 33, 34 at each end of one or both of the legs 48, 49.

With an arrangement as just described, the oppositely facing surfaces 86, 87 of pairs of elements 33, 34 would then snap into place across the edge surfaces 89 and 93 of openings at either end of a leg 48 and/or a leg 49 rather than the edge surfaces 92 as previously described. Furthermore, all of the depending elements may be similar to the elements 33, 34 and directed to snap across a span represented by web 36; across a span with an extent of dimension D in FIG. 2; or combinations thereof.

The elements 33 and 34, after being snapped into place, may be held under tension or compression by the edge surfaces of one or more slots 16 in which the elements 33, 34 have been positioned. Also, as the rounded camming surfaces or leading edges or surface portions 86a, 87a or 52a, 53a of the clips 29 or 51 respecitvely engage the shell 14; depending elements, e.g., elements 33, 34 are stressed and deflected. Then however, upon completion of the insertion of the elements 33, 34, the elements 33, 34 will spring back toward the initial unstressed condition thereof. Depending upon the thickness of the material in shell 14 and surface contours of elements 33 and 34, the elements 33, 34 may be held under slight tension even after being snapped into place. Of course, the same would also be true of the elements 52, 53 which may or may not be held in compression after final assembly. However, if elements 52, 53 are not compressed in a shell opening 16, it is desirable for portions of the shell 14 to be trapped in the slots 96, 97 so as to prevent the inadvertent removal of a clip 51 from the shell 14.

In some embodiments, especially for example where adapter means are formed from thermoresponsive materials, the body portion of the adapter (i.e., a portion that would extend axially between the two rows of slots 16 in FIG. 1) may be a substantially solid block of material. This body or block then would be provided with at least two depending latching members that may correspond, for example, to elements 33, 34 or elements 52, 53.

For an even more stable and reliable arrangement, a total of at least four such depending latching members can be provided on the solid body or block. For ease of use, the four latching members preferably would be located at least approximately at the four corners of the solid block. However, in preferred forms, lesser amounts of thermoresponsive material would be used by minimizing the volume of such solid block or by following an approach suggested by FIGS. 6, 7 and 8 of the drawings.

In FIGS. 6, 7, and 8, adapter means of a type that may readily be formed by molding a thermoresponsive material have been shown. For example, the clips in FIGS. 6–8 may be molded from thermoplastic materials produced from the polymerization of a dibasic acid and a diamine (such materials, as a class, being commonly identified as Nylon). Of course, other commercially available materials (whether condensation plastics or polymerization plastics) may be used, and they may be of the thermosetting or thermoplastic type.

FIG. 6 illustrates an adapter 101 that may be used in lieu of the clips 29 and 51. The adapter 101 includes a pair of legs or sides 102, 103 that, together with stiffener or stabilizer means such as the ends 104, 105 form the body of adapter clip 101. The clip 101 also includes four similar depending elements 106 each of which have camming surfaces or leading edges 107 which can yield during assembly of the clip 101 with a motor shell or housing desirably, all or a portion of pairs of elements 106 will yield as they are advanced past a web (such as web 36 in FIG. 2) of a motor shell and then snap back toward an unstressed condition, with locking edges or surfaces 108 fitting against an internal or bottom surface of such web.

In FIG. 8, an adapter clip 111 has been shown, the body of which includes legs 112, 113, and 114. Elements 115 would function or operate like elements 106 of clip 101; and offset latches or feet 116 are substantially similar to portions 32 of clip 29 in regard to their cooperative interrelationship to a motor housing or shell.

Turning now to FIG. 7, the clip 117 there shown comprises a body portion that includes legs 118, 119, and 121. Extending from legs 119 and 121 are four latching or locking portions 122. When the free extremity of legs 119 and 121 are inserted into an opening of a motor shell such as an opening 54 as shown in FIG. 1; the portions 122 will deflect and snap into such openings so that the surfaces 123 will engage an interior surface of the shell and prevent inadvertent disassembly of clip 117 and a motor to which it has been assembled. The lower, not shown, surface of leg 118 would engage the exterior surface of the motor shell and thereby stabilize the clip in its assembled relationship.

In view of the foregoing, it will be understood that the present invention is versatile, both in the fabrication of embodiments thereof and in the use of the same; and that preferred and alternate embodiments of the invention capable of fulfilling the above stated objects have been disclosed herein. Consequently, while in accordance with the Patent Statutes I have described what at present are considered to be preferred forms of my invention, it will be obvious to those skilled in the art that numerous changes and modifications may be made therein without departing from the true spirit and scope of the invention, and it is therefore aimed in the following claims to cover all such modifications.

What I claim as new and desire to secure by letters Patent of the United States is:

1. A mounting adapter for a dynamoelectric machine, said adapter comprising at least two laterally extending legs and at least two spaced apart resiliently movable depending elements having surfaces for engaging portions of a dynamoelectric machine stationary structure; said depending elements being spaced apart a predetermined distance to trap a predetermined portion of a dynamoelectric machine stationary surface therebetween; said at least two depending elements and at least two laterally extending legs being interconnected whereby the laterally extending legs may be held in a desired relationship to a dynamoelectric stationary surface trapped between said at least two depending elements.

2. The mounting adapter of claim 1 wherein the adapter is formed from sheet material and at least one of the at least two legs is provided with stabilizing means for increasing the rigidity of said at least one of the at least two legs when it is disposed on edge against a dynamoelectric machine stationary surface.

3. The mounting adapter of claim 2 wherein the stabilizing means comprises an offset segment of said at least one of the at least two legs.

4. Mounting adapter means for use in establishing a predetermined spacing between a band type mount and a selected stationary peripheral surface of a dynamoelectric machine, the adapter means comprising: a clip formed of sheet material having at least two legs and means for holding said legs on edge adjacent to the selected stationary peripheral surface; said means for holding including spaced apart elements arranged to interfit in openings formed in at least one dynamoelectric machine peripheral surface.

5. The structure of claim 4 wherein said elements are resiliently movable to thereby provide a snap in effect during assembly of the adapter means and a dynamoelectric machine.

6. The structure of claim 5 wherein at least one of the legs includes an offset segment to thereby stabilize said at least one of the legs when it is held on edge adjacent to the selected stationary peripheral surface.

7. Mounting adapter means for use in establishing a predetermined spacing between a band type mount and a selected stationary peripheral surface of a dynamoelectric machine, the adapter means comprising: a member having at least one leg and means for holding said leg on edge adjacent to the selected stationary peripheral surface; said means for holding including spaced apart elements arranged to interfit in openings formed in at least one dynamoelectric machine peripheral surface.

8. The structure of claim 7 wherein said elements are resiliently movable to thereby provide a snap in effect during assembly of the adapter means and a dynamoelectric machine.

9. The structure of claim 7 wherein said adapter means is formed of a thermoresponsive material.

10. The structure of claim 9 wherein said adapter means is a molded member and includes a body and four latching members extending from said body.

* * * * *